No. 634,344. Patented Oct. 3, 1899.
W. J. HENNING.
PIPE COUPLING.
(Application filed June 1, 1899.)
(No Model.)
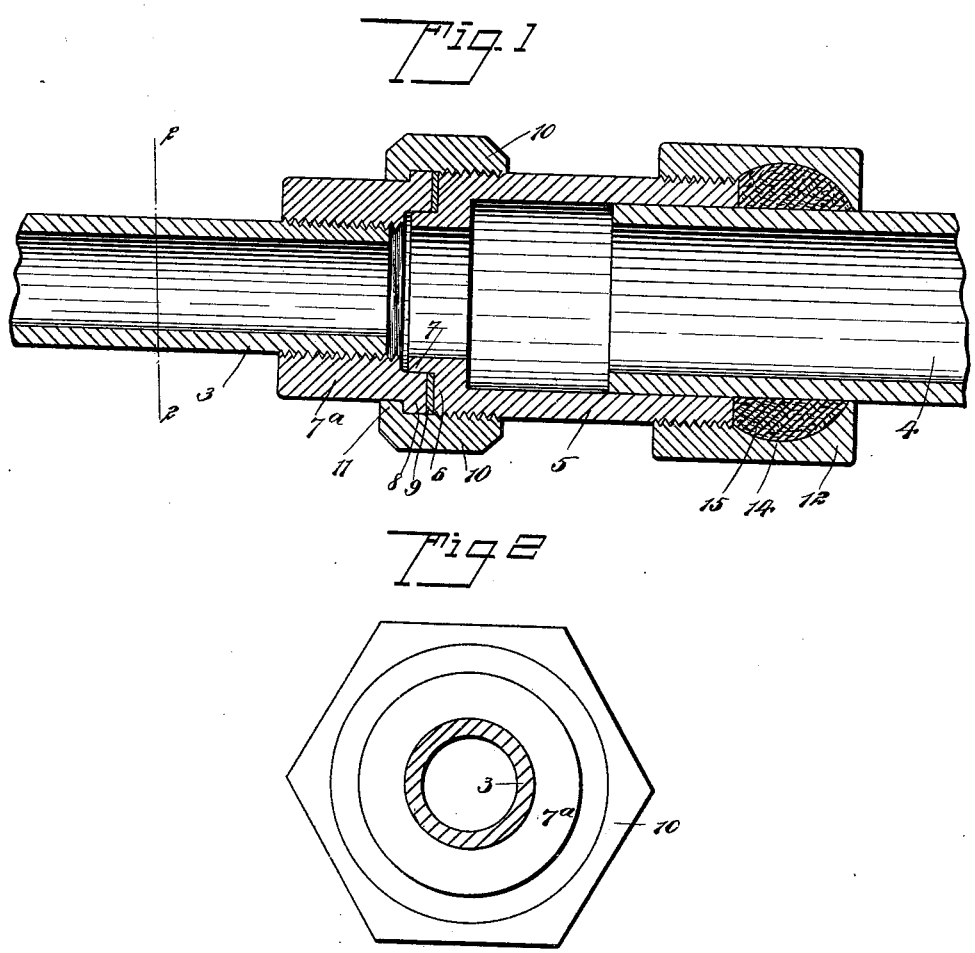

UNITED STATES PATENT OFFICE.

WILLIAM JOHN HENNING, OF KEY WEST, FLORIDA.

PIPE-COUPLING.

SPECIFICATION forming part of Letters Patent No. 634,344, dated October 3, 1899.

Application filed June 1, 1899. Serial No. 718,992. (No model.)

*To all whom it may concern:*

Be it known that I, WILLIAM JOHN HENNING, of Key West, in the county of Monroe and State of Florida, have invented a new and Improved Pipe-Coupling, of which the following is a full, clear, and exact description.

This invention relates to a pipe-coupling adapted to join the ends of pipe, especially when the pipe-sections are mounted rigidly and cannot be moved toward or from each other, the invention being adapted to all sizes of pipes and being capable of joining to each other pipes of different diameters.

This specification is the disclosure of one form of my invention, while the claims define the actual scope thereof.

Reference is to be had to the accompanying drawings, forming a part of this specification, in which similar characters of reference indicate corresponding parts in both views.

Figure 1 is a longitudinal section of the invention, and Fig. 2 is a view showing one of the pipe members in section on the line 2 2 in Fig. 1.

The invention is illustrated as applied to pipe-sections 3 and 4 of different diameters.

The coupling comprises a sleeve 5, loosely embracing the pipe-section 4 and having at its inner end a shoulder 6 and a flange 7. A sleeve $7^a$ is threaded on the pipe-section 3 and has a flanged inner end 8, between which and the shoulder 6 of the sleeve 5 a gasket 9 is arranged. A collar 10 has an inwardly-projecting flange 11 engaging the flange 8 of the sleeve $7^a$, the collar 10 projecting beyond the sleeve $7^a$ and being threaded on the sleeve 5, so that by drawing up the collar 10 the sleeves 5 and $7^a$ may be drawn together and the gasket 9 pressed securely to effect a hermetic connection. For the purpose of mounting the sleeve hermetically on the pipe-section 4 a gland-like collar 12 is threaded on the outer end of the sleeve 5 and formed with an annular chamber 14, in which a packing material 15 is arranged. Now by screwing up the collar 12 on the sleeve 5 the packing-ring 15 will be compressed and forced tightly around the pipe-section 4 to hermetically seal the outer end of the sleeve 5.

By this arrangement it is possible to hermetically couple the ends of pipes without moving the pipes, and also pipes of any diameter may be joined to pipes of unlike diameter, this being effected by regulating the interior size of the sleeves 5 and $7^a$.

Having thus described my invention, I claim as new and desire to secure by Letters Patent—

1. A pipe-coupling, comprising two sleeves respectively adapted to embrace pipe-sections, the first of which sleeves has interior threads to engage one of the pipe-sections, a collar embracing both sleeves and serving to draw them together, and a gland-like collar threaded on the second sleeve and adapted to carry a packing, whereby to hermetically connect said second sleeve with the adjacent pipe-section.

2. A pipe-coupling, comprising two sleeves respectively adapted to engage the pipe-sections, a collar serving to draw the sleeves together to seal the same, and a gland-like collar mounted on one sleeve and adapted to carry a packing, whereby to seal said sleeve on the adjacent pipe-section.

3. A pipe-coupling, having a sleeve adapted to embrace one of the pipe-sections, and a gland-like collar threaded on the sleeve and having a chamber adapted to receive a packing for hermetically sealing the sleeve on the pipe-section.

4. A pipe-coupling, comprising two sleeves adapted respectively to embrace the sections of the pipe, the first of the sleeves having at its inner end an outwardly-projecting annular flange extending continuously around the sleeve forming a shoulder at the inner end of the sleeve, and the second of the sleeves having a shoulder opposed by the shoulder on the first sleeve and also having an annular longitudinally-projected flange extending continuously around the sleeve and projected into the first sleeve at the inner end thereof, and a clamping-collar threaded on the second sleeve and having an inwardly-projected flange opposing the flange on the first sleeve, whereby to draw the shoulders of the two sleeves toward each other.

WILLIAM JOHN HENNING.

Witnesses:
A. J. KEMP,
B. F. H. BOWEN.